United States Patent
Goins

(10) Patent No.: US 7,310,033 B2
(45) Date of Patent: Dec. 18, 2007

(54) MEMS SWITCH ELECTRODE CONFIGURATION TO INCREASE SIGNAL ISOLATION

(75) Inventor: David A. Goins, Austin, TX (US)

(73) Assignee: Teravicta Technologies, Inc., Austin, TX (US)

( * ) Notice: Subject to any disclaimer, the term of this patent is extended or adjusted under 35 U.S.C. 154(b) by 0 days.

(21) Appl. No.: 10/921,696

(22) Filed: Aug. 19, 2004

(65) Prior Publication Data

US 2006/0038642 A1 Feb. 23, 2006

(51) Int. Cl.
*H01H 51/22* (2006.01)
(52) U.S. Cl. ........................................ 335/78; 200/181
(58) Field of Classification Search ................. 335/78; 200/181
See application file for complete search history.

(56) References Cited

U.S. PATENT DOCUMENTS

| | | | |
|---|---|---|---|
| 5,619,061 A | 4/1997 | Goldsmith et al. | |
| 5,638,946 A * | 6/1997 | Zavracky | 200/181 |
| 6,307,452 B1 * | 10/2001 | Sun | 333/262 |
| 6,433,657 B1 | 8/2002 | Chen | |
| 6,483,395 B2 * | 11/2002 | Kasai et al. | 333/105 |
| 6,486,425 B2 | 11/2002 | Seki | |
| 2003/0006858 A1 | 1/2003 | Ma | |

FOREIGN PATENT DOCUMENTS

EP 1 235 244 8/2002

* cited by examiner

*Primary Examiner*—Elvin Enad
*Assistant Examiner*—Bernard Rojas
(74) *Attorney, Agent, or Firm*—Kevin L. Daffer; Mollie E. Lettang; Daffer McDaniel, LLP

(57) ABSTRACT

A microelectromechanical system (MEMS) switch is provided which includes a moveable electrode with an opening arranged over at least a portion of the signal trace. In some cases, the opening may include a notch arranged along a periphery of the moveable electrode. In particular, the opening may include a notch bound by two edges of the moveable electrode which are respectively arranged relative to opposing sides of the signal trace. In other embodiments, the opening may include a hole arranged interior to the peripheral edge of the moveable electrode. In some cases, the MEMS switch may include a plurality of contact structures coupled to signal traces. In such cases, the moveable electrode may include openings specifically arranged above a plurality of the signal traces.

19 Claims, 2 Drawing Sheets

MEMS SWITCH ELECTRODE CONFIGURATION TO INCREASE SIGNAL ISOLATION

BACKGROUND OF THE INVENTION

1. Field of the Invention

This invention relates to microelectromechanical devices, and more particularly, to peripheral configurations of moveable electrodes relative to contact structures included in microelectromechanical devices.

2. Description of the Related Art

The following descriptions and examples are not admitted to be prior art by virtue of their inclusion within this section.

Microelectromechanical devices, or devices made using microelectromechanical systems (MEMS) technology, are of interest in part because of their potential for allowing integration of high-quality devices with circuits formed using integrated circuit (IC) technology. As compared to transistor switches formed with conventional IC technology, for example, microelectromechanical contact switches may exhibit lower losses and a higher ratio of off-impedance to on-impedance. MEMS switch designs generally include a moveable electrode in the form of a beam or a plate spaced apart from a fixed electrode. The switch may include one or more contact structures dielectrically spaced above the fixed electrode and/or arranged along the same plane as the fixed electrode but isolated therefrom. While each of the contact structures may be configured to prevent the moveable electrode from contacting the fixed electrode, some of the contact structures may be "electrically active" in that they are configured to pass and receive current. In particular, electrically active contact structures may include conductive materials and are generally coupled to signal traces which are coupled to input or output signal terminals. Other contact structures, however, may be "electrically inactive" in that they are not configured to pass and receive current.

Upon actuation of the fixed electrode, the moveable electrode moves such that the moveable electrode itself or contact structures coupled to the moveable electrode make contact with the contact structures arranged adjacent to the fixed electrode. This "on state" allows current to pass through the electrically active contact structures. An "off state" corresponds to a state in which the fixed electrode is not actuated and, therefore, contact between the moveable electrode and the contact structures is not made. Due to the narrow spacing between the two electrodes of the switch, capacitive coupling between the moveable electrode and the contact structures adjacent to the fixed electrode may be high enough to cause high-frequency energy from the moveable electrode or electrically active contact structures to leak across to the opposing structure even when the switch is in the off state. The energy leakage is sometimes referred to as poor isolation and generally worsens as the capacitive coupling between the components increases.

In some embodiments, it may be advantageous to position contact structures under the moveable electrode and interior to the peripheral edge of the moveable electrode to provide structural stability to the moveable electrode during actuation. In particular, arranging contact structures under the moveable electrode between the center point and edge of the moveable electrode may serve to better hold the moveable electrode above the fixed electrode during actuation than if all contact structures were arranged under the center point and/or the edges of the moveable electrode. Signal traces coupled to contact structures which are arranged under and interior to the edges of the moveable electrode, however, are also arranged under the moveable electrode. As a consequence, the capacitive coupling of the switch may be undesirably increased, resulting in poor isolation.

It would, therefore, be desirable to develop a MEMS switch which provides low capacitive coupling as well as sufficient structural stability to prevent a moveable electrode from collapsing onto a fixed electrode. In particular, it would be beneficial to create a MEMS switch which allows contact structures to be positioned under and inbound from edges of a moveable electrode without increasing the capacitive coupling of the switch.

SUMMARY OF THE INVENTION

The problems outlined above may be in large part addressed by a microelectromechanical system (MEMS) switch having a moveable electrode with an opening arranged over at least a portion of the signal trace. In some cases, the opening may include a notch arranged along a periphery of the moveable electrode. In particular, the opening may include a notch bound by two edges of the moveable electrode which are respectively arranged relative to opposing sides of the signal trace. Alternatively stated, the opening may include a notch having two edges which are respectively arranged relative to opposing sides of the signal trace. In other embodiments, the opening may include a hole arranged interior to the peripheral edge of the moveable electrode. In yet other cases, the moveable electrode may include both a notch and a through-hole arranged over a portion of a signal trace. In any case, the signal trace may be arranged below the moveable electrode and extend to a region which is in alignment with an outermost peripheral edge of the moveable electrode. In some embodiments, the moveable electrode may include an opening that, in some embodiments, extends over a portion of the signal trace proximate to an edge of a contact structure coupled to the signal trace and arranged beneath the moveable electrode. Alternatively stated, the moveable electrode may include an opening with an edge approximately aligned with an edge of a contact structure. In some embodiments, the opening may be elongated in alignment with the signal trace.

In addition to extending over a portion of the signal trace, the opening may, in some cases, extend over a portion of a substrate upon which the signal trace is formed. For example, in some embodiments, the opening may extend over a portion of the substrate adjacent to the signal trace. In addition or alternatively, the opening may extend over portions of the substrate adjacent to one or more sides of the contact structure. In some embodiments, the opening may extend over portions of the substrate adjacent to both sides of the signal trace. As such, in some embodiments, the width of the opening may be greater than or equal to a width of the signal trace. In some cases, a width of a portion of the substrate over which the notch is arranged may be less than or equal to approximately 50% of a width of the signal trace. Consequently, the opening may, in some embodiments, comprise a width less than or equal to approximately twice a width of the signal trace.

In some embodiments, the MEMS switch described herein may include a plurality of contact structures coupled to signal traces and a moveable electrode arranged above the plurality of contact structures. In some cases, the moveable electrode may include openings arranged above a plurality of the signal traces. For example, in some embodiments, the moveable electrode may include both notches and through-holes over the same signal traces. In other embodiments, the moveable electrode may include notches and through-holes respectively arranged over different signal traces. In yet other cases, the moveable electrode may only include through-holes over a plurality of the signal traces. Alternatively, the moveable electrode may only include notches over a plurality of the signal traces.

In general, the MEMS switch described herein may include any number of support structures with which to support the moveable electrode. For example, in some embodiments, the moveable electrode may be supported by at least two distinct support structures. In particular, the moveable electrode may be a plate having at least two distinct support structures spaced about the periphery of moveable electrode. In other embodiments, the moveable electrode may be a beam having at least two distinct support structures arranged at opposing ends of the beam. In yet other embodiments, the moveable electrode may be supported by a single support structure, such as in cantilever or diaphragm based MEMS switches.

There may be several advantages to fabricating a MEMS switch with a moveable electrode having a notch arranged over a signal trace. In particular, the MEMS switch provided herein may have relatively low capacitive coupling between signal traces and an overlying moveable electrode. As a consequence, a smaller amount of high-frequency energy will leak from the moveable electrode and/or the electrically active contact structures coupled to the signal traces to the opposing structure/s when the switch is in the off state, thereby providing a switch with improved high frequency signal isolation as compared to a MEMS switch having a moveable electrode which does not include notches over underlying signal traces. In addition, the configuration of having contact structures positioned interior to the peripheral edge of the moveable electrode advantageously provides structural stability to the moveable electrode during actuation. As such, a MEMS switch is provided which allows contact structures to be positioned under and inbound from edges of a moveable electrode without increasing the capacitive coupling of the switch.

BRIEF DESCRIPTION OF THE DRAWINGS

Other objects and advantages of the invention will become apparent upon reading the following detailed description and upon reference to the accompanying drawings in which.

Figure 1:
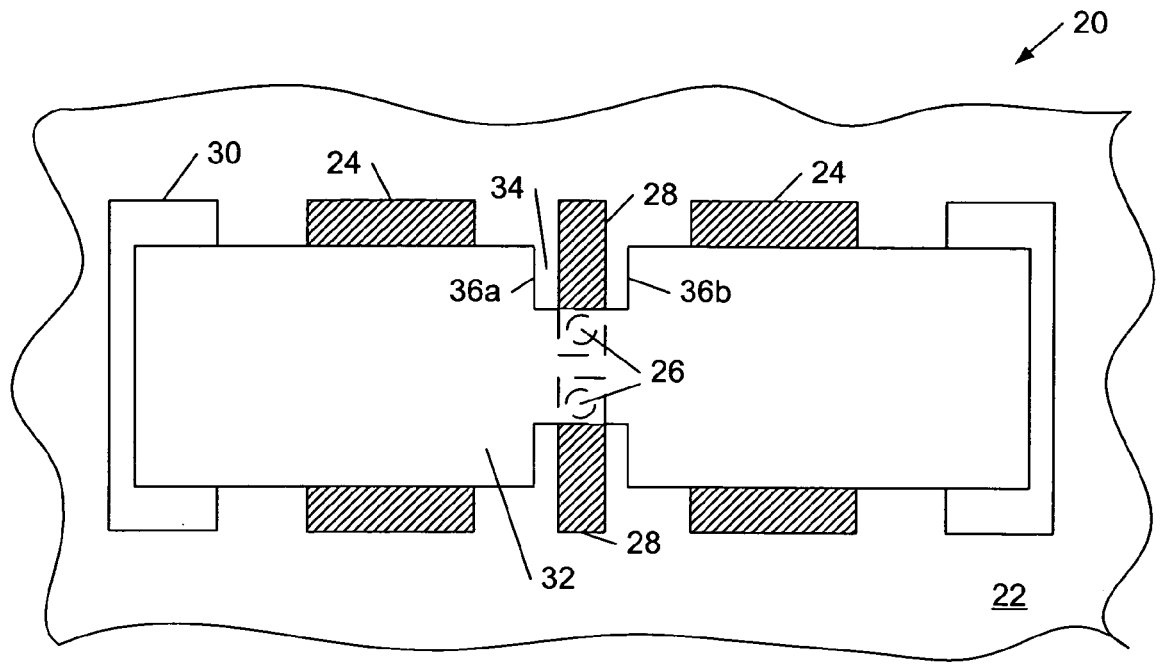
FIG. 1 depicts a plan view of an exemplary MEMS switch with a moveable electrode having notches arranged over portions of underlying signal traces.

While the invention may include various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
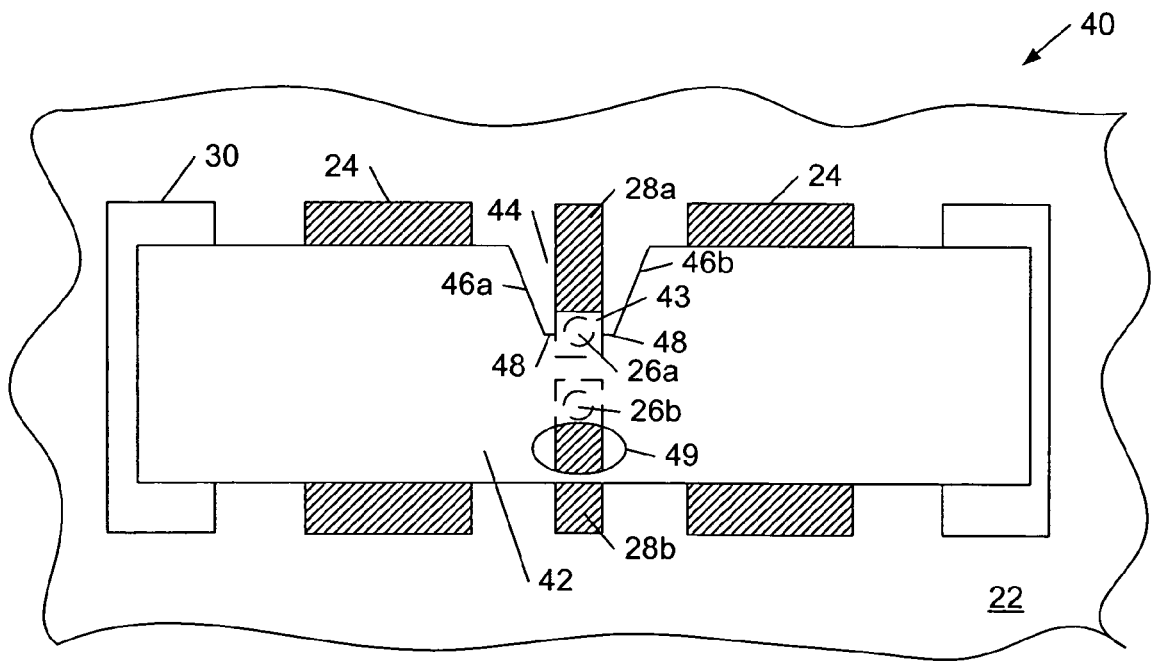
FIG. 2 depicts a plan view of an exemplary MEMS switch with a moveable electrode having a notch with a different configuration than the notches shown in the MEMS switch illustrated in FIG. 1 and a though-hole arranged above a portion of a underlying signal trace.
Figure 3:
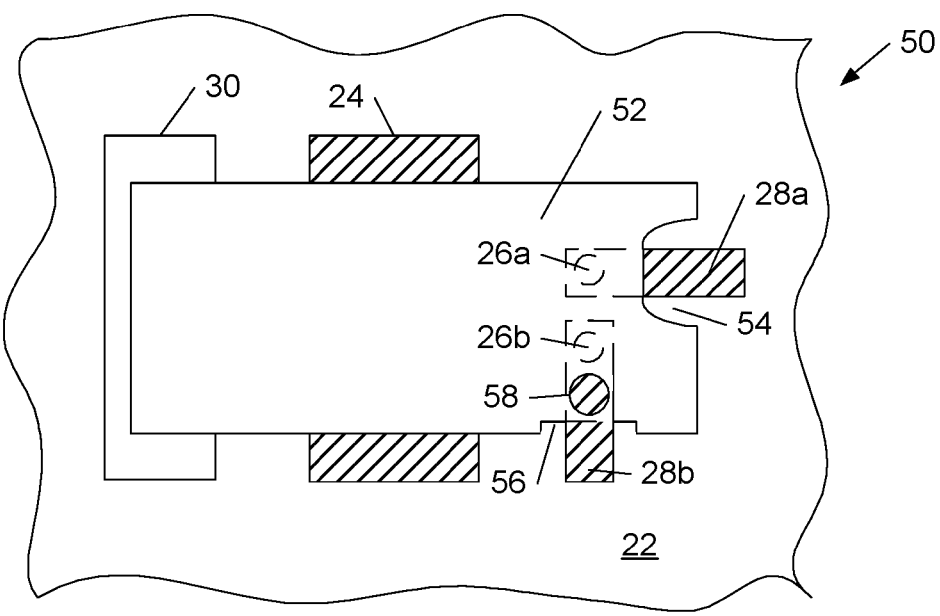
FIG. 3 depicts a plan view of an exemplary MEMS switch with a moveable electrode having notches and through-holes with different configurations than the notches and through-hole shown in the MEMS switch illustrated in FIGS. 1 and 2.
Figure 4:
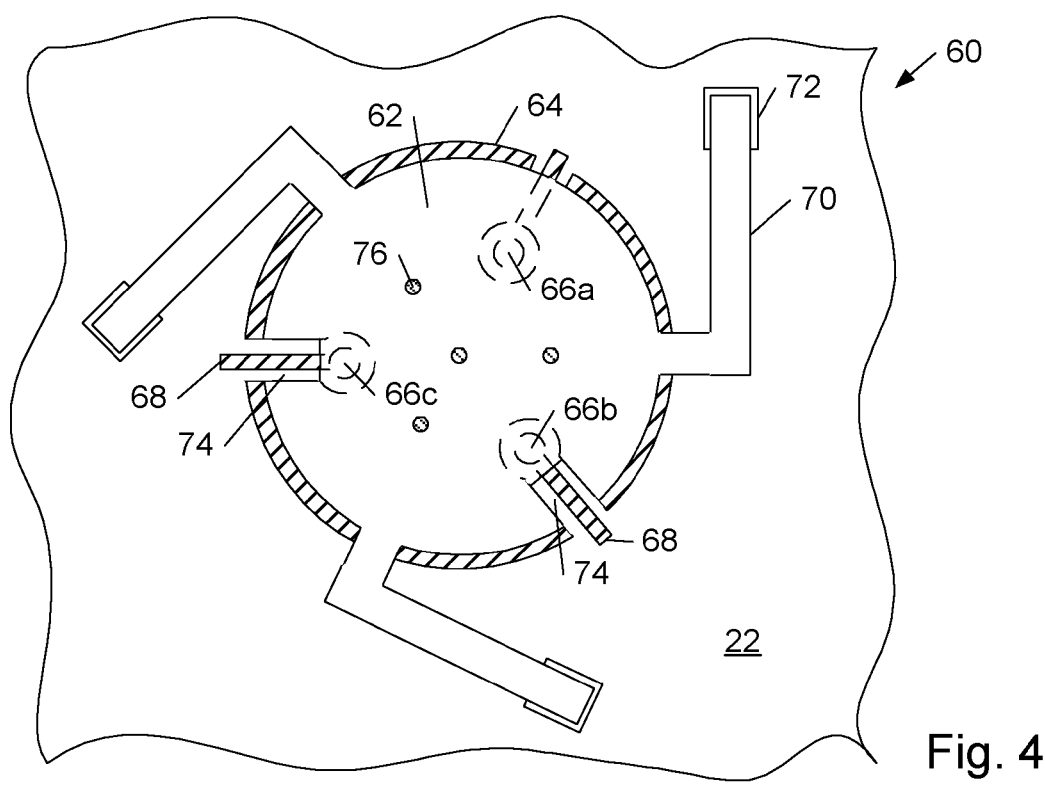
FIG. 4 depicts a plan view of an exemplary MESM switch with a moveable electrode having notches arranged over less than all of the underlying signal traces.

Turning to the drawings, exemplary configurations of microelectromechanical switches having moveable electrodes with openings arranged over at least portions of signal traces are shown. In particular, FIG. 1 shows a plan view of MEMS switch 20 including moveable electrode 32 having notches 34 arranged along the periphery of the electrode, specifically over portions of signal traces 28. As a result, the capacitive coupling between moveable electrode 32 and signal traces 28 may be reduced relative to a MEMS switch having a moveable electrode without notches above signal traces. FIGS. 2 and 3 illustrate alternative configurations of notches as well as holes within moveable electrodes which may also serve to reduce the capacitive coupling between moveable electrodes and underlying signal traces. FIG. 4 illustrates an exemplary MEMS switch having a moveable electrode with openings arranged above less than all of the signal traces included in the switch. As will be explained in more detail below, such a configuration may be particularly advantageous for switches that include electrically inactive contact structures.

In addition to illustrating alternative configurations of openings within moveable electrodes, FIGS. 1-4 illustrate different types of MEMS switches characterized by the form of their moveable components. In particular, FIGS. 1 and 2 illustrate a strap-based MEMS switch including a moveable electrode beam supported at both ends. FIG. 3 illustrates a cantilever-based MEMS switch including a moveable electrode beam supported at one end and free at another. Furthermore, FIG. 4 illustrates a plate-based MEMS switch including a plate supported by a plurality of support structures arranged about a periphery of the plate. Another class of MEMS switches which is not depicted in FIGS. 1-4 is a diaphragm-based structure in which a membrane is supported around most or all of its perimeter.

As noted in more detail below, the configuration of a moveable electrode to have an opening arranged above at least a portion of a signal trace may be incorporated into any type of MEMS switch, including cantilever, strap, diaphragm and plate-based MEMS switches. As such, the different configurations of openings described in reference to FIGS. 1-4 are not exclusive to the type of MEMS switch in which they are shown in FIGS. 1-4. Rather, any of the openings described in reference to FIGS. 1-4 may be incorporated into any MEMS switch having a moveable electrode formed above a signal trace. Consequently, the absence of a diaphragm-based MEMS switch in the figures does not indicate in any way that configurations of moveable electrodes with openings over signal traces are not applicable to diaphragm-based MEMS switches. An illustrative embodiment of a diaphragm-based MEMS switch including a moveable electrode with such a configuration is merely absent in the figures to avoid unnecessarily repeating the numerous configurations of openings for each type of MEMS switch. It is asserted that one skilled in the art of MEMS technology would be appraised of the manner in which to incorporate the teachings provided herein into a diaphragm-based switch.

As shown in FIG. 1, MEMS switch 20 includes contact structures 26 coupled to signal traces 28 and gate electrodes 24 spaced therefrom. In addition, MEMS switch 20 includes structures 30 supporting opposing ends of moveable electrode 32. During an "off state," moveable electrode 32 is spaced above contact structures 26, as well as gate electrodes 24 and signal traces 28. During an "on state," however, MEMS switch 20 is configured to bring moveable electrode 32 in contact with contact structures 26 without making contact with signal traces 28 and gate electrodes 24. As such, contact structures 26 may be formed to a greater height than signal traces 28 and gate electrodes 24. In other words, contact structures 26 may include upper surfaces which are elevationally higher than upper surfaces of signal traces 28 and gate electrodes 24. In some cases, MEMS switch 20 may include contact structures coupled to the underside of moveable electrode 32 specifically aligned with contact structures 28. In addition or alternatively, moveable electrode 32 may include one or more recessed portions, sometimes referred to as "dimples," above contact structures 26. In either embodiment, the contact structures of MEMS switch 20 may be configured such that the contact structures or dimples on the underside of moveable electrode 32 are brought into contact with contact structures 28 without having moveable electrode 32 contact signal traces 28 and gate electrodes 24. Consequently, the upper surfaces of contact structures 28 may, in such cases, be higher, lower or the same elevational height as signal traces 28 and/or gate electrodes 24.

In any case, gate electrode 24 and signal traces 28 may be formed upon substrate 22 as shown in FIG. 1. In an embodiment in which substrate 22 is incorporated into an integrated circuit, substrate 22 may be, for example, a silicon, ceramic, or gallium arsenide substrate. Alternatively, substrate 22 may be alumina, glass, polyimide, metal, or any other substrate material commonly used in the fabrication of microelectromechanical devices. For example, substrate 22 may be a monocrystalline silicon substrate or an epitaxial silicon layer grown on a monocrystalline silicon substrate. In addition, substrate 22 may include a silicon on insulator (SOI) layer, which may be formed upon a silicon wafer.

Gate electrodes 24 may include a conductive material, such as polysilicon or metal such as gold, copper, titanium, tungsten, or alloys of such metals. In some embodiments, gate electrodes 24 may include the same materials. In another embodiments, gate electrodes 24 may include different materials. As shown in FIG. 1, gate electrodes 24 are may be arranged to extend beyond the periphery of moveable electrode 32 in some cases. Alternatively, the lengths of gate electrodes 24 may be substantially similar or less than the width of moveable electrode 32. In any case, the widths of gate electrodes 24 may be substantially similar as shown in FIG. 1. Alternatively, gate electrodes 24 may have substantially different widths. In particular, one of gate electrodes 24 may be wider or narrower than the other. In some cases, gate electrodes 24 may be arranged symmetrically under moveable electrode 32. For example, gate electrodes 24 may be arranged under moveable electrode 32 such that there is an equal distance between each gate electrode and its respective end of the beam. In some embodiments, the symmetrical arrangement may additionally or alternatively include an equal distance between each of the gate electrodes and contact structures 26. Conversely, the arrangement of gate electrodes 24, in some embodiments, may be asymmetrical under moveable electrode 32. In particular, gate electrodes 24 may be spaced at an unequal distance from the respective ends of moveable electrode 32 and/or contact structures 26.

As shown in FIG. 1, contact structures 26 may be interposed between gate electrodes 24. In some embodiments, contact structures 26 may include a conductive material such as gold, copper, titanium, tungsten, or an alloy of such metals. As such, one or both of contact structures 26 may include the same material as one or both of gate electrodes 24 in some cases. Such a configuration may be particularly advantageous for fabricating contact structures 26 and gate electrodes 24 at the same time. Alternatively, one or both of contact structures 26 may include a different material than one or both of gate electrodes 24. In some cases, contact structures 26 may be wired in parallel to reduce the combined resistance of the contact structures. In other embodiments, one or both of contact structures 26 may include a non-conductive material such as silicon dioxide, silicon nitride, silicon oxynitride, or silicon dioxide/silicon nitride/silicon dioxide (ONO). For example, one or both of contact structures 26 may include a dielectric cap layer arranged upon the conductive material. In some cases, contact structures 26 may include single structures. In other embodiments, one or both of contact structures 26 may include multiple sections. In such an embodiment, the plurality of sections may include different materials. Alternatively, the multiple sections may include the same material.

In any case, contact structures 26 may be coupled to signal traces 28 as shown in FIG. 1. In cases in which signal traces 28 are coupled to input or output terminal pads and contact structures comprise conductive materials, contact structures 26 may be considered electrically active or, more specifically, may be configured to pass and receive current through MEMS switch 20. In general, one or both of contact structures 26 may be electrically active. In cases in which signal traces 28 are not coupled to input or output terminal pads or contact structures 26 include a dielectric material, contact structures 26 may be considered electrically inactive. In some cases, one or more contact structures of MEMS switch 20 may not be coupled to a signal trace and, therefore, may also be considered electrically inactive. Such electrically inactive contact structures may serve as support structures for moveable electrode 32 during an "on state" rather than conducting a signal through the switch. In general, signal traces 28 may include any conductive material. For example, signal traces 28 may include gold, copper, titanium, tungsten, or an alloy of such metals. In some cases, signal traces 28 may include the same material as included in contact structures 26 and/or gate electrodes 24. Alternatively, signal traces 28 may include a different material than included in contact structures 26 and/or gate electrodes 24. In addition, signal traces 28 may be substantially the same height gate electrodes 24. Alternatively, signal traces 28 may be substantially higher or lower than gate electrodes 24.

Although FIG. 1 illustrates MEMS switch 20 including two gate electrodes, two contact structures and two signal traces, MEMS device 20 may include any number of such components. In particular, MEMS switch 20 may include additional gate electrodes interposed between gate electrodes 24 and support structures 30 and/or between gate electrodes 24 and contact structures 26. In addition or alternatively, MEMS switch 20 may include additional contact structures arranged on either or both sides of contact structures 26 and/or interposed between gate electrodes of the switch. In yet other cases, MEMS switch 20 may include only one contact structure and/or gate electrode. In any case, MEMS switch 20 may include any number of signal traces, some of which may be coupled to input or output terminal pads and others which are not. As noted above, some contact structures may not be coupled to signal traces and, as such, the number of signal traces may not, in some embodiments, be the same as the number of contact structures interposed between gate electrodes 34. In yet other cases, the number of contact structures and signal traces within MEMS switch 20 may be the same.

Structures 30 may include similar materials to those used for contact structures 26 and/or gate electrodes 24. As such, structures 30 may include conductive or non-conductive materials. In an embodiment in which structures 30 are conductive, structures 30 may serve to send and/or receive signals and, therefore, may be considered electrically active. In some cases, structures 30 may include the same material as included in contact structures 26 and/or gate electrodes 24. Alternatively, structures 30 may include a different material than included in contact structures 26 and/or gate electrodes 24. In addition, structures 30 may be substantially the same height as contact structures 26 and/or gate electrodes 24. Alternatively, structures 30 may be substantially higher or lower than contact structures 26 and/or gate electrodes 24.

Moveable electrode 32 may include a variety of materials. For example, moveable electrode 32 may include a conductive material such as gold, copper, titanium, tungsten, or an alloy of such metals. In some cases, moveable electrode 32 may include the same material as included in gate electrodes 24, contact structures 26 and/or signal traces 28. Alternatively, moveable electrode 32 may include a different material than included in gate electrodes 24, contact structures 26 and/or signal traces 28. Preferably, moveable electrode 32 includes a material that may adequately bend in response to the introduction of an actuation force, such as an electrostatic or magnetic force between one or more of the gate electrodes and the moveable electrode. In some cases, moveable electrode 32 may further include a dielectric material.

As shown in FIG. 1, the portions of contact structures 26 and signal traces 28 underlying moveable electrode 32 are outlined by dotted lines to emphasize the position of notches 34 along the periphery of moveable electrode 32. Although FIG. 1 illustrates the shape, size and relative position of notches 34 to be substantially similar, MEMS switch 20 is not restricted to such a configuration. In particular, notches 34 may include different shapes and sizes as well as different positions relative to signal traces 28. As such, although notches 34 are described below as both being arranged in a similar manner, it is noted that one or both of notches 34 may be arranged in a different manner. As shown in FIG. 1, notches 34 are bound by edges 36a and 36b of moveable electrode 32. In general, edges 36a and 36b may be respectively arranged relative to opposing edges of signal traces 28. For example, in some embodiments, edges 36a and 36b may be arranged substantially parallel to opposing sidewalls of signal traces 28 as shown in FIG. 1. In other embodiments, edges 36a and 36b may be angled, curved or stepped relative to opposing edges of signal traces 28. An exemplary embodiment of a moveable electrode having a notch with angled edges is described in more detail below in reference to FIG. 2. Another exemplary embodiment of a moveable electrode having a notch with curved edges is described in more detail below in reference to FIG. 3.

As shown in FIG. 1, notches 34 may, in some embodiments, be arranged over portions of substrate 22 as well as portions of signal traces 28. In particular, notches 34 may extend over a portion of substrate 22 adjacent to signal traces 28 in some cases. In some embodiments, notches 34 may extend over portions of substrate 22 adjacent to both sides of signal traces 28 as shown in FIG. 1. As such, in some embodiments, the width of notches 34 may be greater than or equal to a width of signal traces 28. In some cases, a width of the portions of substrate 22 over which notches 34 are arranged may be less than or equal to approximately 50% of a width of signal traces 28. Consequently, notches 34 may, in some embodiments, comprise a width less than or equal to approximately twice a width of signal traces 28. In other embodiments, however, the width of notches 34 may be less than or equal to a width of signal traces 28. In such embodiments, notches 34 may not be arranged over portions of substrate 22 adjacent to signal traces 28. In addition or alternatively, notches 34 may not be centered over signal traces 28 in some cases. Although the width of signal traces 28 may depend on the design specifications of the switch, an exemplary range of widths for signal traces 28 may generally be on the order of a few microns. As such, the portions of substrate adjacent to signal traces 28 above which notches 34 may be arranged may be less than approximately a couple of microns.

In some embodiments, notches 34 may extend over a portion of signal traces 28 proximate to edges of contact structures 26. In general, it may be advantageous to arrange notches 34 over larger portions of signal traces 28 to minimize the amount of capacitive coupling between moveable electrode 32 and signal traces 28. As such, it may be advantageous for notches 34 to extend along signal traces 28 to a region in alignment or nearly in alignment with edges of contact structures 26 as shown in FIG. 1. In addition, it may be advantageous for notches 34 to extend over regions of substrate 22 adjacent to signal traces 28 as noted above since capacitive coupling between moveable electrode 32 and signal traces 28 may be prevalent in such regions. In some cases, it may be advantageous to have notches 34 arranged over portions of substrate 22 adjacent to one or more edges of contact structures 26. An exemplary configuration of a moveable electrode including a notch extending over portions of substrate 22 adjacent to opposing edges of contact structures 26 is shown in FIG. 2.

FIG. 2 illustrates a plan view of a MEMS switch with a moveable electrode having alternative configurations of openings which may be arranged over signal traces. As shown in FIG. 2, MEMS switch 40 may include gate electrodes 24, contact structures 26a and 26b, signal traces 28a and 28b, and support structures 30 arranged above substrate 22. In addition, MEMS switch 40 may include moveable electrode 42 above each of such components. In general, substrate 22, gate electrodes 24, contact structures 26a and 26b, signal traces 28a and 28b, and support structures 30 may include similar configurations and compositions as the components described in FIG. 1 having similar reference numbers. Contact structures 26a and 26b and signal traces 28a and 28b have been differentiated such that the different opening configurations within moveable electrode 42 arranged relative to such components may be described. As noted above, the different opening configurations shown in FIG. 2 are not specific to the strap-based type MEMS switch illustrated in FIG. 2. In addition, the different opening configurations illustrated in FIG. 2 are not mutually exclusive. Rather, either or both of the different opening configurations illustrated in FIG. 2 may be incorporated into any MEMS switch comprising a signal trace underlying a moveable electrode.

As shown in FIG. 2, MEMS switch 40 includes moveable electrode 42 with notch 44 arranged over a portion of signal trace 28a as well as over portions of substrate 22 arranged adjacent to signal trace 28a and opposing edges of contact structure 26a. Although notch 44 extends to opposing sides of contact structure 26a, moveable electrode 42 preferably has a region arranged above contact structure 26a. In particular, moveable electrode 42 has region 43 jutting out from edges 48 of notch 44 above contact structure 26a. Although edges 48 of notch 44 are shown in FIG. 2 substantially in alignment with a mid-section of contact structure 26a, edges 48 may extend any distance into moveable electrode 42, including beyond contact structure 26a as long as moveable electrode 42 remains as a contiguous piece. Alternatively, edges 48 may extend to less than a mid-section of contact structure 26a. In any case, edges 48 may be arranged in substantial alignment as shown in FIG. 2. In other embodiments, edges 48 may be arranged at different distances into moveable electrode 42.

Although not shown, notch 44 may, in some embodiments, be arranged over portions of signal trace 28a adjacent to jut-out region 43, specifically adjacent to edges of contact structure 26a along which notch 44 extends to edges 48. In such cases, jut-out region 43 may include a width substantially similar to a width of contact structure 26a. In other embodiments, however, contact structure 26a may be aligned with edges of signal trace 28a as shown in FIG. 2. Consequently, jut-out region 43 may include a width substantially similar to a width of signal trace 28a in some embodiments. In yet other cases, jut-out region 43 may include a width substantially different than widths of contact structure 26a and signal trace 28a. For example, jut-out region 43 may include a width greater than a width of signal trace 28a.

In addition to showing a configuration of an opening which is arranged adjacent to opposing sides of contact structure 26a, notch 44 illustrates sidewalls 46a and 46b angled relative to the sidewalls of signal trace 28a. The relative position of sidewalls 46a and 46b illustrated in FIG. 2 are not mutually exclusive to a notch configuration extending to portions adjacent to opposing sides of contact structure 26a. As such, in alternative embodiments, sidewalls 46a and/or 46b may be arranged substantially parallel to the sidewalls of signal trace 28a or may be curved or stepped relative to the sidewalls of signal trace 28a. In addition, the portions of notch 44 arranged over the portions of substrate 22 arranged adjacent to signal trace 28a and contact structure 26a may not necessarily be similar. In particular, the portions of notch 44 arranged over the portions of substrate 22 arranged adjacent to signal trace 28a may be wider or narrower than the portions of notch 44 arranged over the portions of substrate 22 arranged adjacent to contact structure 26a.

As noted above, FIG. 2 illustrates another configuration of an opening within a moveable electrode which may be arranged over a signal trace. In particular, FIG. 2 illustrates hole 49 arranged above a portion of signal trace 28b. As shown in FIG. 2, hole 49 is arranged interior to the periphery of moveable electrode 42. In this manner, hole 49 is distinct from a notch arranged along the peripheral edge of moveable electrode 42. Similar to notch 34 and 44 described above, however, hole 49 may be arranged above portions of substrate 22 as well as portions of signal trace 28b. In particular, hole 49 may be arranged above portions of substrate 22 arranged adjacent to either or both sides of signal trace 28b. In addition or alternatively, hole 49 may be configured to be arranged above portions of substrate 22 arranged adjacent to contact structure 26b. In particular, although hole 49 is shown having an elliptical profile, hole 49 may be configured to have any profile by which to expose underlying portions of substrate 22. In yet other embodiments, hole 49 may not be configured to be arranged above portions of substrate 22. In any case, hole 49 may, in some embodiments, be arranged proximate to an edge of contact structure 26b as shown in FIG. 2. In some cases, hole 49 may be arranged above a majority or, more specifically, a bulk portion of signal trace extending from contact structure 26b to a region which is in alignment with a peripheral edge of moveable electrode 42. In yet other embodiments, hole 49 may be one of a plurality of holes arranged above signal trace 28b. 22. *In any case, hole 49 may, in some embodiments, be arranged proximate to an edge of contact structure 26b as shown in FIG. 2. In some cases, hole 49 may be arranged above a majority or, more specifically, a bulk portion of signal trace extending from contact structure 26b to a region which is in alignment with a peripheral edge of moveable electrode 42. In yet other embodiments, hole 49 may be one of a plurality of holes arranged above signal trace 28b.*

In addition to showing alternative opening configurations that may be incorporated into a moveable electrode to reduce the capacitive coupling between the moveable electrode and underlying signal traces, FIG. 2 illustrates a MEMS switch incorporating both a notch and a hole within a moveable electrode to accomplish such an objective. It is noted that the MEMS switches described herein may include any number of notches and any number of holes arranged over signal traces of the switch. As such, the MEMS switches described herein are not restricted to configurations which only include notches or only include holes by which to reduce the capacitive coupling between a moveable electrode and underlying signal traces.

As noted above, the configurations of openings within the moveable electrodes described herein may be arranged within different types of MEMS switches, such as cantilever, diaphragm and plate-based switches. As such, some different types of MEMS switches incorporating openings with the moveable electrodes are provided in FIGS. 3 and 4. In particular, FIG. 3 illustrates a plan view of MEMS switch 50 including gate electrode 24, contact structures 26a and 26b, signal traces 28a and 28b, and structure 30 arranged above substrate 22. In addition, MEMS switch 50 includes moveable electrode 52 above each of such components. In general, substrate 22, gate electrode 24, contact structures 26a and 26b, signal traces 28a and 28b, and structure 30 may include similar configurations and compositions as the components described in FIGS. 1 and 2 having similar reference numbers. MEMS switch 50, however, differs from MEMS switches 20 and 40 in that only one structure is used to support moveable electrode 52 in the "off state". In this manner, MEMS switch 50 is a cantilever-based switch.

MEMS switch 50 further differs from MEMS switches 20 and 40 by including only one gate electrode. MEMS switch 50, however, is not restricted to such a configuration and, therefore, may include any number of gate electrodes. In addition, MEMS switch 50 may include any number of contact structures, including both electrically active and inactive contact structures, some of which may be coupled to signal traces and others which may not. MEMS switch 50 illustrates signal trace 28a oriented in a different manner than shown in FIGS. 1 and 2. In particular, signal trace 28a extends out past an end of moveable electrode 52 rather than a side of the electrode as in MEMS switches 20 and 40. Such a rearrangement of signal trace 28a is merely shown to illustrate that the orientation of the signal traces may differ from the arrangements shown in FIGS. 1-4. In some cases, signal trace 28b may also be oriented to extend beyond the end of moveable electrode 52. Alternatively, signal traces 28a and 28b may be oriented in a similar manner as the components with similar reference numbers in FIG. 2.

As shown in FIG. 3, moveable electrode 52 may include notch 54 arranged over a portion of signal trace 28a. Notch 54 may include curved edges which are respectively arranged relative to opposing sides of signal trace 28a. In alternative embodiments, notch 54 may include edges which are parallel, angled or stepped relative to the sides of signal trace 28a. As with notches 34 and 44, notch 54 may be arranged to be above portions of substrate 22 as well as a portion of signal trace 28. For example, in some cases, notch 54 may be arranged above portions of substrate 22 as shown in FIG. 3. In addition or alternatively, notch 54 may be arranged above portions of substrate 22 adjacent to one or more opposing sides of contact structure 26a. In yet other embodiments, notch 54 may not be arranged above portions of substrate 22. In any case, notch 54 may be arranged proximate to an edge of contact structure 26a in some embodiments. In other cases, however, notch 54 may not be arranged proximate to an edge of a contact structure 26a as shown in FIG. 3. In particular, the length of notch 54 extending into moveable electrode 52 may vary between the outer peripheral edge of the moveable electrode and the general region of the contact structure to which the underlying signal trace is coupled.

Another notch which is included along the periphery of moveable electrode 52 and which is not aligned proximate to a contact structure is notch 56 arranged over a portion of signal trace 28b in FIG. 3. Besides the difference in length, notch 56 may be configured in any of the manners in which notches 34, 44, and 54 are described above. In particular, notch 56 may be arranged above portions of substrate 22 adjacent to one or more opposing sides of contact structure 26b. In yet other embodiments, notch 56 may not be arranged above portions of substrate 22. As shown in FIG. 3, moveable electrode 52 may further include hole 58 arranged above signal trace 28b interposed between notch 56 and a region of moveable electrode 52 overlying contact structure 26b. Alternatively stated, hole 58 is arranged above signal trace 28b interior to a peripheral edge of moveable electrode 52 or, more specifically, interior to a peripheral edge of notch 56. In this manner, the MEMS switch described herein may include a moveable electrode having both a notch and a hole arranged above a single signal trace. As shown in FIG. 3, hole 58 may be arranged only above signal trace 28b. In other embodiments, however, hole 58 may be arranged above portions of substrate 22, including portions adjacent to signal trace 28b and portions adjacent to contact structure 26b.

FIG. 4 illustrates yet another configuration of a MEMS switch including openings within a moveable electrode for reducing the capacitive coupling between signal traces and the moveable electrode. In particular, FIG. 4 illustrates plate-based MEMS switch 60 including moveable electrode 62 arranged above gate electrode 64, contact structures 66a-66c, signal traces 68, and substrate 22. In addition, plate-based MEMS switch 60 includes support arms 70 extending from and with the same plane as moveable electrode 62 to structures 72, which are coupled to substrate 22. In general, support arms 70 and structures 72 may serve as the support structures with which to support moveable electrode 62. In particular, structures 72 hold support arms 70 and moveable electrode 62 above fixed electrode 64, contact structures 66a-66c, signal traces 68, and substrate 22. Support arms 72, however, are configured to twist and bend such that moveable electrode 62 may move uniformly toward gate electrode 64 during an "on-state." U.S. patent application Ser. No. 10/921,746 filed on Aug. 19, 2004 which is incorporated by reference as if fully set forth herein, describes exemplary configurations of a plate-based MEMS switch having different quantities and configurations of support arms and contact structures.

As shown in FIG. 4, moveable electrode 62 may include openings above portions of some of signal traces 68. In particular, moveable electrode 62 may include notches 74 arranged above portions of signal traces 68 coupled to contact structures 66b and 66c. In general, notches 74 may include any configuration which is described above in relation to notches 34, 44, 54 and 56. In some embodiments, moveable electrode 62 may include holes arranged above signal traces 68 instead of or in addition to notches 74. Such holes may include any configuration of holes which are described above in relation to holes 49 and 58. In some embodiments, moveable electrode 62 may include additional holes 76 to allow chemical access to the underside of the electrode during fabrication as well as allow air to escape during actuation. The number, size, and arrangement of holes 76 in moveable electrode 62 are not restricted to the configuration shown in FIG. 4. In particular, moveable electrode 62 may include any number of holes of any size and the holes may be arranged in any manner. Holes 76, however, are distinct from holes which are used to reduce capacitive coupling between signal traces and the moveable electrode since holes 76 are not specifically arranged above signal wires 68.

As shown in FIG. 4, moveable electrode 62 does not include an opening above the signal trace coupled to contact structure 66a. In some embodiments, contact structure 66a may be designated to be electrically inactive and, thus it may not be advantageous to include a notch or a hole above the signal trace underlying the contact structure. Consequently, openings within a moveable electrode do not necessarily need to be incorporated for every signal trace of a switch. In other embodiments, moveable electrode 62 may include an opening above the signal trace coupled to contact structure 66a, regardless of whether the contact structure is electrically active or inactive. The inclusion of an opening over all of signal traces 68 in such an embodiment may be advantageous for inducing uniformity within moveable electrode 62. In other embodiments, contact structure 66a may not be coupled to a signal trace.

It will be appreciated to those skilled in the art having the benefit of this disclosure that this invention is believed to provide a MEMS switch having an opening arranged over at least a portion of a signal trace. Further modifications and alternative embodiments of various aspects of the invention will be apparent to those skilled in the art in view of this description. For example, although a diaphragm-based switch is not illustrated herein to have a moveable electrode with an opening over a signal trace, the configuration of a moveable electrode with such an opening may be applied to a diaphragm-based switch. It is intended that the following claims be interpreted to embrace all such modifications and changes and, accordingly, the drawings and the specification are to be regarded in an illustrative rather than a restrictive sense.

What is claimed is:

1. A microelectromechanical system (MEMS) switch, comprising:
   a contact structure coupled to a signal trace; and
   a moveable electrode arranged above the contact structure, wherein a periphery of a conductive portion of the moveable electrode comprises a notch extending over at least a portion of the signal trace, wherein a width of the notch is greater than a width of the signal trace, and wherein the notch is bound by:
- first and second edges of the moveable electrode which are respectively arranged relative to opposing sides of the signal trace; and
- a third edge of the moveable electrode which is arranged relative to the width of the signal trace.

2. The MEMS switch of claim 1, wherein the signal trace is arranged upon a substrate, and wherein the notch further extends over a portion of the substrate.

3. The MEMS switch of claim 2, wherein the notch extends over a portion of the substrate adjacent to the signal trace.

4. The MEMS switch of claim 3, wherein a width of the portion of the substrate adjacent to the signal trace over which the notch extends is less than or equal to approximately 50% of a width of the signal trace.

5. The MEMS switch of claim 2, wherein the notch extends over portions of the substrate adjacent to opposing sides of the contact structure.

6. The MEMS switch of claim 1, wherein the conductive portion of the moveable electrode comprises a through-hole above the signal trace and interior to a peripheral edge of the notch.

7. A microelectromechanical system (MEMS) switch, comprising:
- a plurality of contact structures coupled to signal traces; and
- a moveable electrode arranged above the plurality of contact structures, wherein the moveable electrode comprises through-holes arranged interior to a peripheral edge of the moveable electrode and directly above a plurality of the signal traces.

8. The MEMS switch of claim 7, wherein at least one of the through-holes comprises a width which is greater than or equal to a width of at least one of the signal traces.

9. The MEMS switch of claim 7, wherein at least one of the through-holes comprises a width less than or equal to approximately double a width of at least one of the signal traces.

10. The MEMS switch of claim 7, wherein at least one of the through-holes is elongated in alignment with at least one the signal traces.

11. The MEMS switch of claim 7, wherein at least one of the through-holes comprises an edge approximately aligned with an edge of the contact structure.

12. The MEMS switch of claim 7, wherein the moveable electrode further comprises notches arranged along the peripheral edge.

13. The MEMS switch of claim 12, wherein at least one of the notches is arranged over one of the plurality of signal traces.

14. A microelectromechanical system (MEMS) switch, comprising:
- a moveable electrode comprising at least two distinct support structures;
- a contact structure arranged beneath the moveable electrode; and
- a signal trace coupled to the contact structure and lying between the support structures upon a substrate, wherein a conductive portion of the moveable electrode comprises an opening arranged over:
  - at least a portion of the signal trace; and
  - portions of the substrate adjacent to two opposing sides of the signal trace.

15. The MEMS switch of claim 14, wherein the moveable electrode is a beam, and wherein at least two distinct support structures are arranged at opposing ends of the beam.

16. The MEMS switch of claim 14, wherein the moveable electrode is a plate, and wherein the at least two distinct support structures are spaced about the periphery of moveable electrode.

17. The MEMS switch of claim 14, wherein the opening comprises a notch arranged along a periphery of the conductive portion of the moveable electrode.

18. The MEMS switch of claim 14, wherein the opening comprises a hole arranged interior to a peripheral edge of the conductive portion of the moveable electrode.

19. The MEMS switch of claim 1, further comprising another contact structure coupled to another signal trace, and wherein another conductive portion of the moveable electrode comprises a through-hole above the other signal trace.

* * * * *